United States Patent [19]
Knazek et al.

[11] 3,883,393
[45] May 13, 1975

[54] CELL CULTURE ON SEMI-PERMEABLE TUBULAR MEMBRANES

[75] Inventors: Richard A. Knazek; Pietro M. Gullino, both of Bethesda, Md.; Robert L. Dedrick, McLean, Va.; William R. Kidwell, Bethesda, Md.

[73] Assignee: The United States of America as represented by the Secretary of Health, Education and Welfare, Washington, D.C.

[22] Filed: Feb. 11, 1974

[21] Appl. No.: 441,445

Related U.S. Application Data

[62] Division of Ser. No. 254,678, May 18, 1972, Pat. No. 3,821,087.

[52] U.S. Cl. ................................................. 195/1.8
[51] Int. Cl. .............................................. C12k 9/00
[58] Field of Search ............. 195/1.1, 1.7, 1.8, 109, 195/127, 139; 210/22, 321

[56] References Cited
UNITED STATES PATENTS
| | | | |
|---|---|---|---|
| 3,223,595 | 12/1965 | Brewer | 195/139 |
| 3,583,907 | 6/1971 | Borsanyi | 210/321 |

*Primary Examiner*—Sam Rosen

[57] ABSTRACT

The growth of cells in vitro on semi-permeable, tube-shaped membranes or capillaries is disclosed. Cells are initially allowed to settle onto the outer surfaces of the membranes in a nutrient medium environment while the membranes are continuously perfused by oxygenated nutrient medium flowing through the membranes. Nutrient substances diffuse from the perfusing medium through the membrane wall and into the cells, while cell products diffuse from the cell through the membrane wall into the perfusate from which the cell products may be recovered.

5 Claims, 5 Drawing Figures

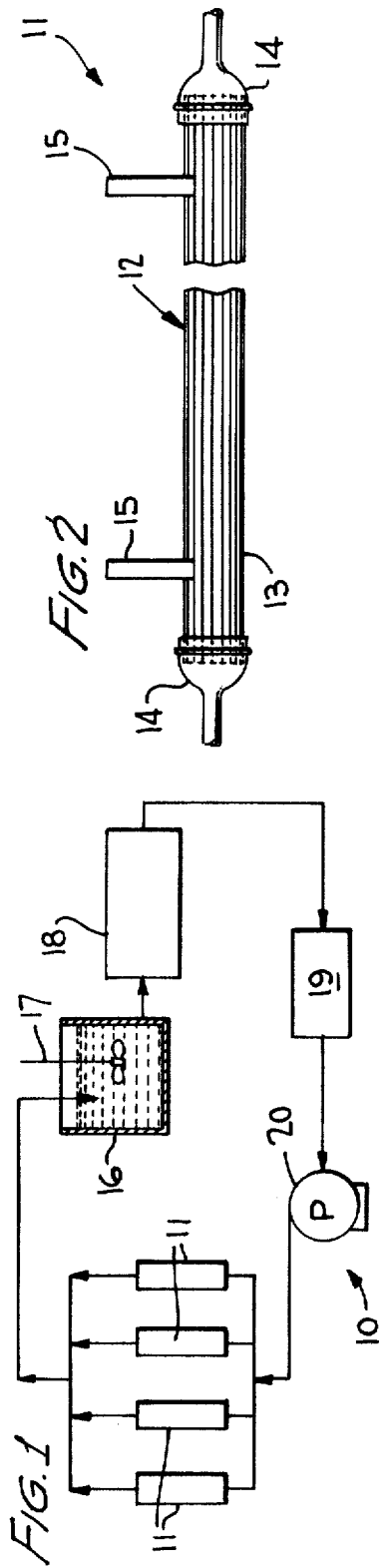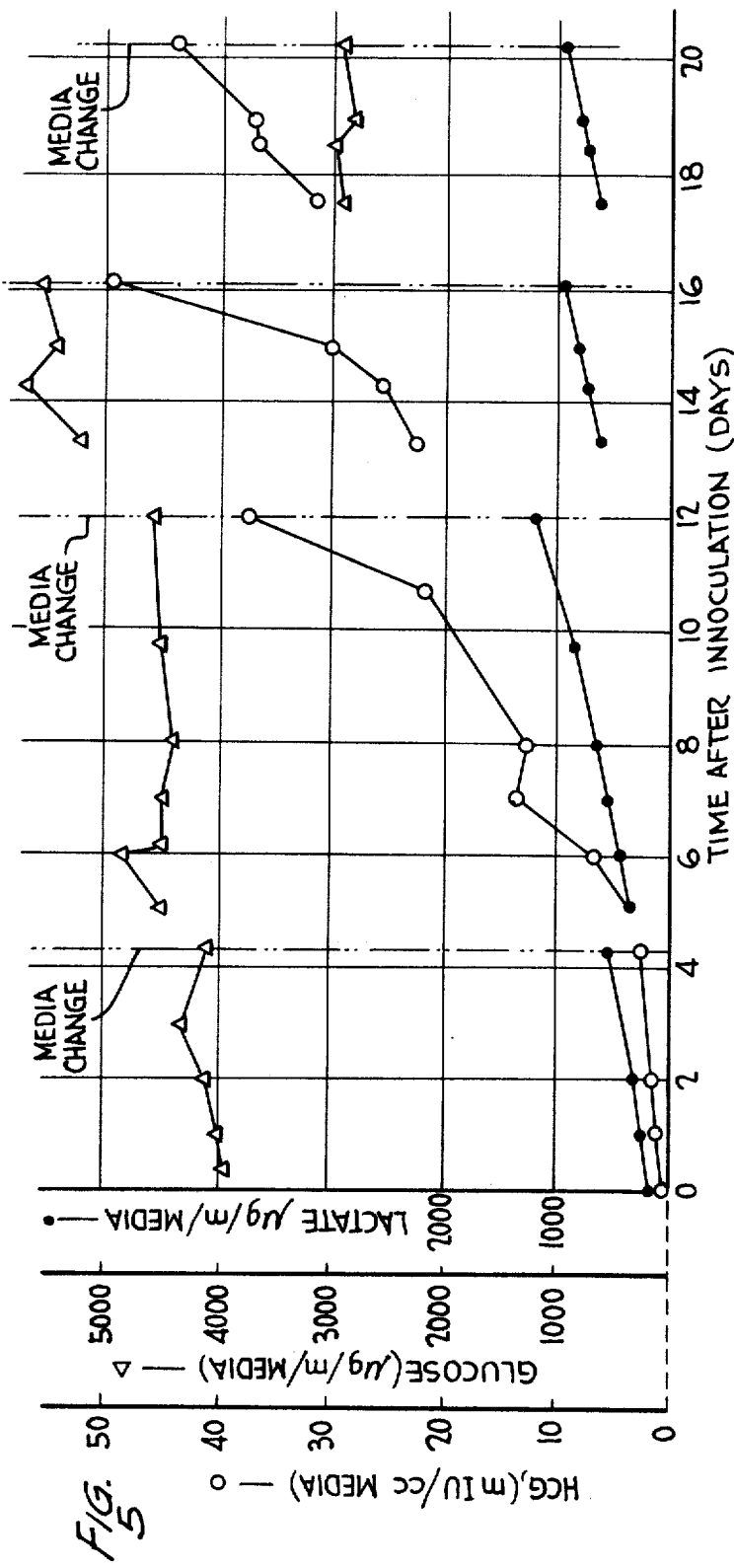

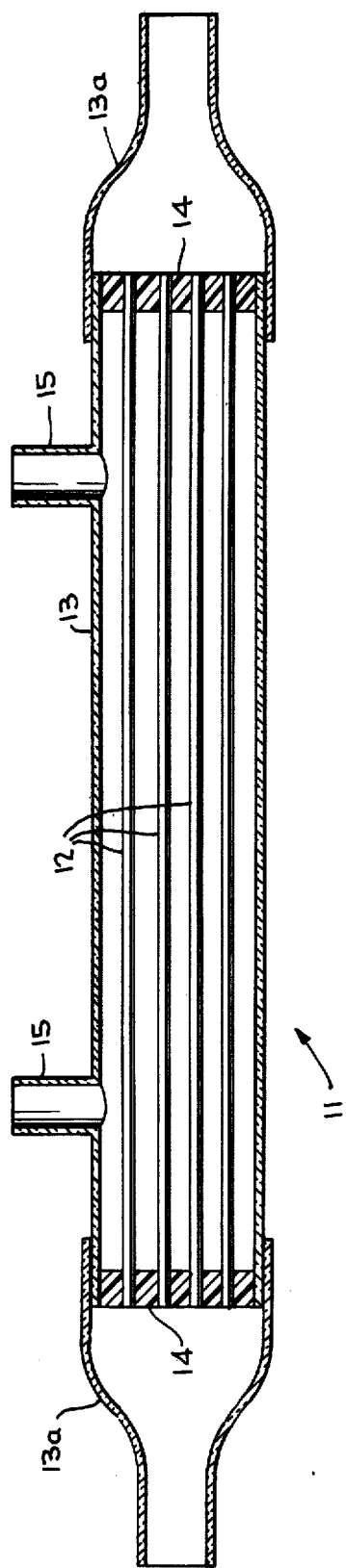

CELL CULTURE ON SEMI-PERMEABLE TUBULAR MEMBRANES

This is a division of application Ser. No. 254,678, filed May 18, 1972, now U.S. Pat. No. 3,821,087 issued June 28, 1974.

BACKGROUND AND SUMMARY OF THE INVENTION

The present invention relates to the growth of living cells and more particularly, to apparatus and a method for growing cells on semi-permeable, tube-shaped membranes (hereinafter referred to as "capillaries"). In accordance with the invention, cells suspended in nutrient medium are initially allowed to settle onto the outer surfaces of capillaries which are continuously perfused by oxygenated nutrient medium flowing through the capillaries. Nutrient substances diffuse from the perfusing medium through the capillary wall and into the cell, while cell products, e.g., lactic acid and hormones, diffuse from the cell through the capillary wall into the perfusate from which these products may be recovered.

Attempts to grow cells to densities and/or structures approaching those of living tissues have included various means of supplying nutrient medium to the cells. Very high cell densities have been obtained, for example, in suspension cultures, although not approaching those of living tissues.* Also, three dimensional growth of tumor cells in thin layers has been induced in small pieces of cellulose sponge, a technique which appears to favor nutrient supply to and support matrix for cell growth.* Also, circumfusion techniques have permitted depths of about 17 cell layers to be attained.** Such prior art methods have not produced an organ-like structure in vitro.

*Bryant, J. C., Ann. N.Y. Acad. Sci., 139, Art.1, p.143(1966).
*Leighton, J., G. Justh, M. Esper, R. L. Kronenthal, Science 155, p. 1259(1967).
** Kruse, Jr., P. F., L. N. Keen, W. L. Whittle, In Vitro,6,1, p.75(1970).

The results of research in this area point to certain basic problems which must be overcome in order to grow an organ-like structure in vitro. The first and most obvious problem is that components of the medium must diffuse through the cell layers to reach all cells, and this diffusion, of course, becomes more difficult as the thickness of the cell layer increases.

A second problem associated with growing an organ-like structure in vitro may be the maintenance of a suitable "micro-environment" in conventional cell culture. Thus, the fluid immediately adjacent the growing cell is continuously changing as cellular metabolism proceeds and is returned to its original status only in stepwise fashion when the culture medium is changed or agitated en masse.

A third problem appears to be the requirement for a lattice or suitable material upon which to grow the organ-like structure. By the present invention, the above and other requirements are satisfied by a method and apparatus for growing cells which provide:

a. nutrient sources within the cell mass which supply both large and small essential molecules;

b. sinks within the cell mass to remove the products of metabolism;

c. a suitable microenvironment;

d. a lattice to permit growth in three dimensions; and e. a surface area for mono- and/or multi-layer cell cultures which is large relative to the volumes required by standard cell culture techniques.

In the present invention, cells suspended in nutrient medium are initially allowed to settle onto the outer surface of capillaries through which oxygenated nutrient medium continuously flows. Nutrient substances pass from the perfusing medium through the capillary wall and into the cell, while cell products, e.g., lactic acid and hormones, pass from the cell through the capillary wall and into the perfusate. These products may be recovered by suitable means.

In accordance with the present invention, a system may be constructed which includes at least one cell culture unit, along with a medium reservoir, a gas exchanger, a pH meter and a pump to provide controlled flow rates of the perfusate. Favorable concentration gradients permit nutrients to diffuse through the walls of the capillaries into the cells while the cellular products diffuse into the perfusate. Cell growth may be estimated by one of several means:

a. trypsinization of capillary bundles with subsequent cell counts;

b. microscopic examination of stained sections of the bundles;

c. measurement of cell components or products; or d. uptake of nutrients and/or markers.

A feature of the present invention, in addition to the growing of cells, involves the retrieval from the culture of products of the cells grown on the capillaries while the culture itself remains undisturbed. Examples of these products include hormones and other biological substances which in the past have been obtained from living tissue or excretory products by standard techniques.

Referring to the drawings:

FIG. 1 is a schematic diagram of a system for growing cells on capillaries according to the present invention;

FIG. 2 is a cross-sectional view of a cell culture unit of the present invention;

FIG. 5 is a graph showing the concentration of various substances in the perfusate reservoir vs. time.

DESCRIPTION OF THE PREFERRED EMBODIMENTS

Figure 3:
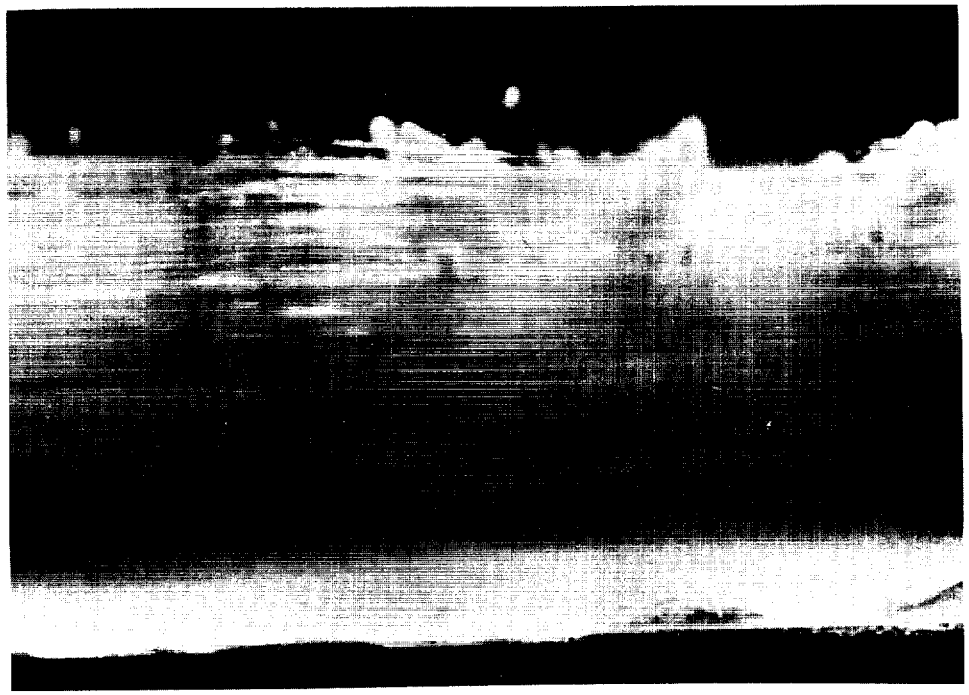
FIG. 3 is a photograph showing cells on cellulose acetate capillaries after 14 days growth.

In the illustrated embodiment of the present invention as shown in FIGS. 1 and 2, apparatus 10 is provided for growing cells on capillaries. The apparatus 10 includes one or more cell culture units 11 containing at least one capillary 12 constructed of semi-permeable material. When more than one cell culture unit 11 is employed, the units may be employed in a parallel arrangement, as shown in FIG. 1 or in series. A plurality of capillaries 12 is preferably employed in each cell culture unit 11. Such a plurality of capillaries, which together form a bundle, produces a system which simulates a vascular network of living tissue. The capillaries 12, typically having a length of about 3 to 4 inches, are inserted into the unit's shell 13 formed of glass or a similar inert material and the ends of these members 12 are secured in end pieces 14 formed of epoxy resin or other suitable sealing material at each end of the shell 13 so that a liquid nutrient medium flowing into an end cap 13a of the cell culture unit 11 will pass through the capillaries 12 and exit through the opposite end cap 13a of the unit 11. Thus a nutrient medium introduced on the shell side of the capillaries 12 will not undergo bulk mixing with the perfusate. Separate perfusion of the shell side through the ports 15 without bulk mixing with the perfusate flowing through the capillaries is also possible.

A reservoir 16 is provided for the perfusing medium, with the contents preferably being agitated by means such as a paddle 17. A closed polyethylene cylinder having a capacity of 80 cc has been employed with good results. The nutrient medium passes from one component of the system to another through silicone rubber tubing or other suitable tubing material, preferably having an outside diameter of about one-eighth inch.

Gas transfer into the perfusing medium is provided by an oxygenator 18 or artificial lung equipment having a membrane of silicone rubber or other suitable material to provide sufficient gas transfer into the perfusing medium. A commercially available Mini-Lung manufactured by Dow Corning Corporation has been employed for this purpose. Either air-$CO_2$ or oxygen-$CO_2$ mixtures may be employed to provide means for both $pO_2$ and pH control. The perfusion medium should be exposed to a suitable mixture of $CO_2$ in air or oxygen prior to being pumped through the capillaries 12 of the cell culture unit 11. A mixture of 5% $CO_2$ in air has been used. The gas should be humidified prior to entry into the gas exchanger to prevent excessive water loss from the perfusate.

A pH meter 19 has been connected in the line to provide a continuous on-line reading of pH values. A pump 20 provides suitable prefusate flow rates. When the cell culture units 11 are employed in a parallel arrangement, it has been found preferable to have a separate pump head for each cell culture unit to provide identical flow rates through each cell culture unit.

The capillaries 12 may be formed of any of a variety of semi-permeable materials. These permit cell growth in three dimensions while allowing nutrient medium to diffuse through the capillary walls 12 to feed the cells as cellular products diffuse from the cells back through the capillary walls 12 into the perfusate. Suitable materials include various cellulosic or other polymeric materials. Materials which are particularly suitable include semi-permeable cellulose acetate membranes fashioned into hollow, tube-shaped fibers, such as, for example, those hollow fibers manufactured by Dow Chemical Company or the hollow fibers of a polymeric material manufactured by the Amicon Corporation, such fibers being commonly employed in ultrafiltration and dialysis. The hollow fibers manufactured by Dow Chemical Company typically have an inner diameter from 180 to 200 microns, an outer diameter of 230 to 250 microns and are capable of allowing molecules having a molecular weight of up to about 30,000 to pass through the walls. One type of material from the Amicon Corporation has a larger diameter and wall thickness and permits diffusion of substances having molecular weights of up to about 50,000.

An additional type of capillary which may be employed is manufactured of a silicone polycarbonate material. Such materials permit the rapid diffusion of gases. Thus, it is often advantageous to employ capillaries of different materials within a single cell culture unit such as, for example, a mixture of cellulose acetate capillaries and silicone polycarbonate members, to improve the passage of oxygen from the perfusing medium into the cells.

Capillaries coated with collagen seem to permit more rapid cellular proliferation by either conditioning the medium or providing an additional matrix for cell support between and upon the capillaries.

The bundle of capillaries 12 within each cell culture unit provides a matrix on which cells are permitted to grow. Variations may be made in capillary structure or composition in order to limit the size of molecules which diffuse through the capillary wall and thus provide selectivity as to the components to be made available to the cells or the products to be removed.

The medium employed to provide nutrients for cell growth may be any suitable composition which will make available the nutrients which the cells need for growth and/or function. In general, the choice of the medium will depend upon the cell line being employed at a particular time.

In operation, cells suspended in a nutrient medium are introduced into the shell side of the cell culture unit 11 through one port 15 and the cells are allowed to settle onto the capillaries 12 that are continuously perfused by an oxygenated nutrient medium.

Each capillary should preferably have a diameter small enough that a group bundled together will provide a large surface area so that significant quantities of cells may be grown in a small volume. The diameter of the capillaries should be small enough that when bundled together, a cell growing on any of the capillaries which has reached the limiting diffusive length of the nutrient supply and product removal afforded by that capillary will then come within the radius of influence of one or more adjacent capillaries. The depth to which the cells will grow is limited by the distance to which nutrients or toxic products can travel to or from the cells. Providing more than one capillary in proximity to a cell therefore increases the availability of nutrients and waste removal, thus improving the chances for survival, growth and function of the cell.

Prior to operation the entire system 10 is sterilized, e.g., ethylene oxide for 6 hours, exposed to air for from one to two days and then flushed with sterile nutrient medium for from 1 to 2 days to remove any residual traces of ethylene oxide. The apparatus 10 can be operated in an incubator at about 37°C and near 100% humidity.

The procedures for growing cells in accordance with the present invention are illustrated by the following examples.

EXAMPLE 1

Three commercially available T-tubes containing approximately 110 hollow cellulose acetate fibers having a 200 micron inner diameter and 25 micron wall thickness (Dow c/HFU-1/20 T-tube ultrafilter CA-C hollow fibers) were aligned in parallel as shown in FIG. 1. All equipment except the pH electrode was gas sterilized for 6 hours with ethylene oxide and then aired for 48 hours. The pH electrode tip to be in contact with the perfusing medium was treated with 70% ethanol for 2 hours. The apparatus was then housed in an incubator held at 37°C and near 100% humidity. Sterile Eagle's No. 2 Basal Spinner medium containing 10% fetal calf serum, 30 mg % glutamine, 5.0 mg % streptomycin, and 2.08 mg % penicillin, was placed in the reservoir and circulated through the cell culture units for 48 hours and was then discarded. The shell side of each cell culture unit was also filled with the same type of medium for this time period.

Figure 4:
FIG. 4 is a photograph showing the same capillaries as in FIG. 3, after a total of 28 days growth.

A total of 220,000 mouse L-cells (a sub-line of clone 929) were suspended in 2 ml of the same type of medium and then introduced into the emptied shell side of the cell culture unit 48 hours later. The port was then closed. The perfusion medium was replaced at this time by removing the medium from the reservoir and replacing it with 80 cc of fresh, warm medium. The medium was then pumped through each unit at 0.3 ml per minute. Approximately 1.5 liters per minute of 5% $CO_2$ in air fed the gas exchanger and maintained the pH at approximately 7.0. Subsequent medium changes were made every other day for the first 8 days and then daily thereafter. Six days after innoculation, microscopic observation of the cell culture unit showed many clumps of cells approximately 200 microns in diameter while only a thin layer of cells was attached to the glass shell. Observation on the 14th day showed many more clumps up to 600 microns in diameter as seen in FIG. 3. One of the cell culture units yielded an amount of DNA equivalent to 17.3 × $10^6$ cells after 2 weeks growth using the method of Burton.* The cell nodules seen in FIG. 3 continued to grow reaching approximately 800 microns in diameter on the 28th day, as shown in FIG. 4. Manipulation of the cell culture units dislodged several cell masses from the bundle which fell onto the glass shell. No nodules, however, formed on the glass shell.

*Burton, K., Biochem. J., 62, p. 315 (1956).

The run was stopped after 29 days. The shell side medium was removed and replaced with warm 4% agarose. After cooling, both ends of the unit were broken and the agarose plug containing the bundle and cells was removed. Sections of the bundle were fixed and stained with Hematoxylin and Eosin. Cells grew both between and atop the capillaries.

Simultaneous samples of shell and perfusate showed pH, glucose and lactate concentrations were nearly equal.

EXAMPLE 2

Two Dow c/HFU-1/20 T-tube ultrafilter CA-C hollow fiber units were aligned in parallel as shown schematically in FIG. 1 and sterilized for six hours in ethylene oxide. Traces of the ethylene oxide were subsequently removed by airing the system for 2 days and then flushing the system with sterile Ham's F-10 culture medium (Gibco No. 155) containing 13.5% horse serum, 3.2% fetal calf serum, 2.08 mg % penicillin, and 5.0 mg % streptomycin for 2 days which was then discarded. Air containing 5% $CO_2$ was passed through the gas exchanger. Fresh medium was then placed in the reservoir; and 2 cc of the medium containing a total of 2 × $10^6$ freshly trypsinized human choriocarcinoma cells (Type JEG-1)* were introduced into the shell side of each cell culture unit through the shell port which was then capped.

*Kohler, P. O., and W. E. Bridson, J. Clin. Endocr. Metab., 32, 5, p. 683 (1971)

Microscopic observation of the cell culture unit during the run showed a gradual increase in the number of cells attached to the capillaries.

The perfusate was sampled and/or replaced periodically during the subsequent 40 days and analyzed for glucose, lactate, and HCG (human chorionic gonadotropin) content. The graph in FIG. 5 shows glucose, lactate, and HCG levels of the perfusate during the course of the experiment. Glucose concentrations were measured using Worthington Biochemical Corporation "Glucostat" reagent 7451 and technique. Lactate concentrations were determined using Boehringer Mannheim Corporation Test TC-B 15972 TLAA.

Radioimmune analyses* showed the HCG concentration was significantly higher in the shell-side medium than in the perfusate. This was probably because HCG is only moderately permeable through the type of cellulose acetate used. (A bundle made up of capillaries which permit passage of larger molecules should allow HCG and other high molecular weight products to be removed from the shell side medium more readily. Such a material is the XM-50 polymer hollow fiber manufactured by the Amicon Corporation, permeable to molecules having a molecular weight of up to about 50,000.)

*Odell, W. D., P. L. Rayford, G. T. Ross, J. Lab. Clin. Med., 70, p. 973 (1967).

The steadily rising HCG titer of the perfusing medium during the initial 3 week period shows the feasibility of removing a cellular product from the cell culture without disturbing its viability or resorting to extensive manipulative procedures.

EXAMPLE 3

A combination of thirty XM-50 capillaries and thirty silicone polycarbonate capillaries were placed in a 6 mm inner diameter / 8 mm outer diameter glass tube which had two ports as seen in FIG. 2.

The sealant used to hold the bundle ends within the shell was a mixture of 12 grams General Electric RTV-11 liquid silicone rubber and 8 grams Dow Corning 360 Medical Fluid catalyzed by 1 drop of Tenneco Nuocure 28-Nuodex at room temperature.

Then both ends of the capillary bundle were tied tightly to prevent sealant from entering the capillaries. One end of the unit was then placed in the catalyzed sealant for 12–24 hours. At the end of this period the solidified sealant was trimmed from the outer portion of the shell and the bundle was cut flush to the shell end. The procedure was then repeated to seal the other end of the capillary bundle within the shell.

A modification of the method of Leighton, et al.*, was used to treat the capillary bundles as follows:

*Leighton, et al., Supra.

A solution of 1 part collagen dispersion (Ethicon, Inc., C14N-C150K, T.D. No. 29) in 4 parts deionized water was injected into the shell side of each cell culture unit and allowed to remain overnight. They were then air dried for 12 hours, flushed with a solution of 50% methanol and 0.5% ammonium hydroxide in deionized water for 12 hours, and then rinsed with deionized water for 2 hours.

Four cell culture units were prepared in this manner and, except for the absence of the pH electrode, were arranged in parallel as shown in FIG. 1.

The apparatus was sterilized in ethylene oxide for 6 hours, aired for 1 day, and flushed with medium MS 109 containing 10% fetal calf serum, 5 mg % insulin, 6.2 mg % cortisone acetate, 2.08 mg % penicillin, and 5.0 mg % streptomycin for 1 day which was then discarded.

The medium used for both perfusate and cell suspension was Ham's F-10 as described in Example 2 except for the addition of 5 mg % insulin, 6.2 mg % cortisone acetate and approximately 500 mg % glucose. Nineteen days after cell innoculation, the glucose concentration was changed to approximately 100 mg %.

The reservoir was filled with about 100 cc of fresh medium which was pumped through each cell culture unit at 0.7 cc per minute. The shell was then filled with a suspension of approximately $1.5 \times 10^6$ freshly trypsinized JEG-7 human choriocarcinoma cells* per ml after which the ports were closed. The gas concentration fed into the oxygenator was approximately 5% $CO_2$ in air.

*Kohler, et al, Supra.

The apparatus was held near 37°C and 100% humidity. The medium within the reservoir was replaced and/or sampled every 2-4 days.

The cell mass gradually became visible to the unaided eye on the capillary bundle while the rate of HCG production gradually increased.

EXAMPLE 4

Two cell culture units were constructed as described in Example 3 but were not treated with collagen. They were then arranged in parallel as shown in FIG. 1 but without a pH electrode. The apparatus was sterilized in ethylene oxide for 6 hours, aired for 2 days, and flushed with MS 109 medium containing 10% fetal calf serum, 2.08 mg % penicillin, and 5.0 mg % streptomycin for 2 days which was then discarded.

The perfusate and cell suspension medium was Ham's F-10 as described in Example 2.

The perfusate reservoir was filled with 100 cc Ham's F-10 medium which then perfused each unit at 5 cc per minute. Each shell was filled with a suspension containing $1.8 \times 10^6$ JEG-7 human choriocarcinoma cells per ml. Air containing approximately 2% $CO_2$ flowed through the oxygenator. The entire apparatus was again held near 37°C and 100% humidity. The cellular masses on the capillary bundles gradually increased in size and became apparent to the unaided eye while the rate of HCG production rose as in Example 3.

As can be seen from the preceding examples, many advantages were inherent in the present invention which provides for growing cells in vitro while also allowing the retrieval of cell products. For example, it is unnecessary to manipulate the cells to change the nutrient medium since a fresh supply is made available by replacing the medium in the reservoir. The present system permits controlled operating conditions and allowed optimization of cell growth and function. It will be apparent that various changes may be made in the present apparatus and method without departing from the spirit and scope of the invention or sacrificing all of its material advantages, the forms hereinbefore described being merely preferred embodiments thereof.

The embodiments of the invention in which an exclusive property or priviledge is claimed are defined as follows:

1. A method for the formation and maintanence of solid tissues in vitro comprising:
   a. arranging a multiplicity of capillaries within a chamber simulating a vascular network, the capillaries having walls which are permeable to nutrients required for cell growth and/or cell products and being arranged with individual capillaries extending in substantially parallel relationship to each other within the chamber, dividing the chamber by the walls of the capillaries into an intracapillary space within the capillaries and an extracapillary spaced outside the capillaries, the intracapillary space and the extracapillary space communicating with each other only through the walls of the capillaries, the capillaries being spaced from each other so as to provide sufficient extracapillary space for three-dimensional growth of a large number of cells, with the capillaries being in sufficient proximity that when the depth of cell growth on one capillary is such that the cells growing on that capillary farthest from that capillary can no longer obtain nourishment from perfusate passing through that capillary and/or removal of waste products by perfusate passing through that capillary, such cells will be influenced by perfusate passing through at least one other capillary;
   b. introducing living cells into the extracapillary space so that the cells will settle onto the capillaries; and
   c. passing perfusate through the intracapillary space.

2. The method of claim 1 further including the step of recovering cell products passing from the cells through the capillary walls to the perfusate.

3. The method of claim 1 further including providing capillaries at least some of which have walls which are permeable to nutrients and/or cells products of large molecular weight and at least some of which have walls which are permeable to gases.

4. The method of claim 3 comprising providing capillaries having walls formed of different semi-permeable materials, some of which are more permeable to gases than others.

5. The method of claim 1 wherein the perfusate is oxygenated and pH controlled prior to being passed through the intracapillary space.

* * * * *